April 16, 1957     F. B. HARRIS     2,788,796
VALVE
Filed Aug. 21, 1953

Ferrel B. Harris
INVENTOR,

BY Bernard P. Miller
ATTORNEY

United States Patent Office 2,788,796
Patented Apr. 16, 1957

2,788,796

VALVE

Ferrel B. Harris, Borger, Tex.

Application August 21, 1953, Serial No. 375,611

2 Claims. (Cl. 137—246.22)

The present invention relates to valves for fluid conveying lines and more particularly to valves commonly known as the cone-type.

The device more particularly relates to packing arrangement for the upper end of such cone-type valves.

The prime object of the invention is to provide a valve and packing gland arrangement therefor, so designed that the packing may be replaced while pressure is maintained within the valve, or within the flow line to which it is attached.

In most conventional cut-off cone-type valves, it is necessary to cut off line pressure from the valve, in order to replace the packing around the upper valve stem.

The present device is so arranged that the valve may be repacked without otherwise disturbing its operation.

An additional object is to provide a valve of this type which is simple to repack and re-assemble.

The mechanism of the present invention is so designed that the cone-shaped core seats upwardly against packing which holds the internal pressure, while the usual packing around the valve stem is being replaced.

A further object is to provide a cone-type valve in which the sealing lubricant around the cone or valve core may be changed or replaced without shutting off the flow of fluid through the valve.

Other objects will be apparent from the following description when taken in conjunction with the accompanying one sheet drawings, wherein.

Like characters of reference designate like parts in those figures of the drawings in which they occur.

In the drawings.

Figures 1, 2:
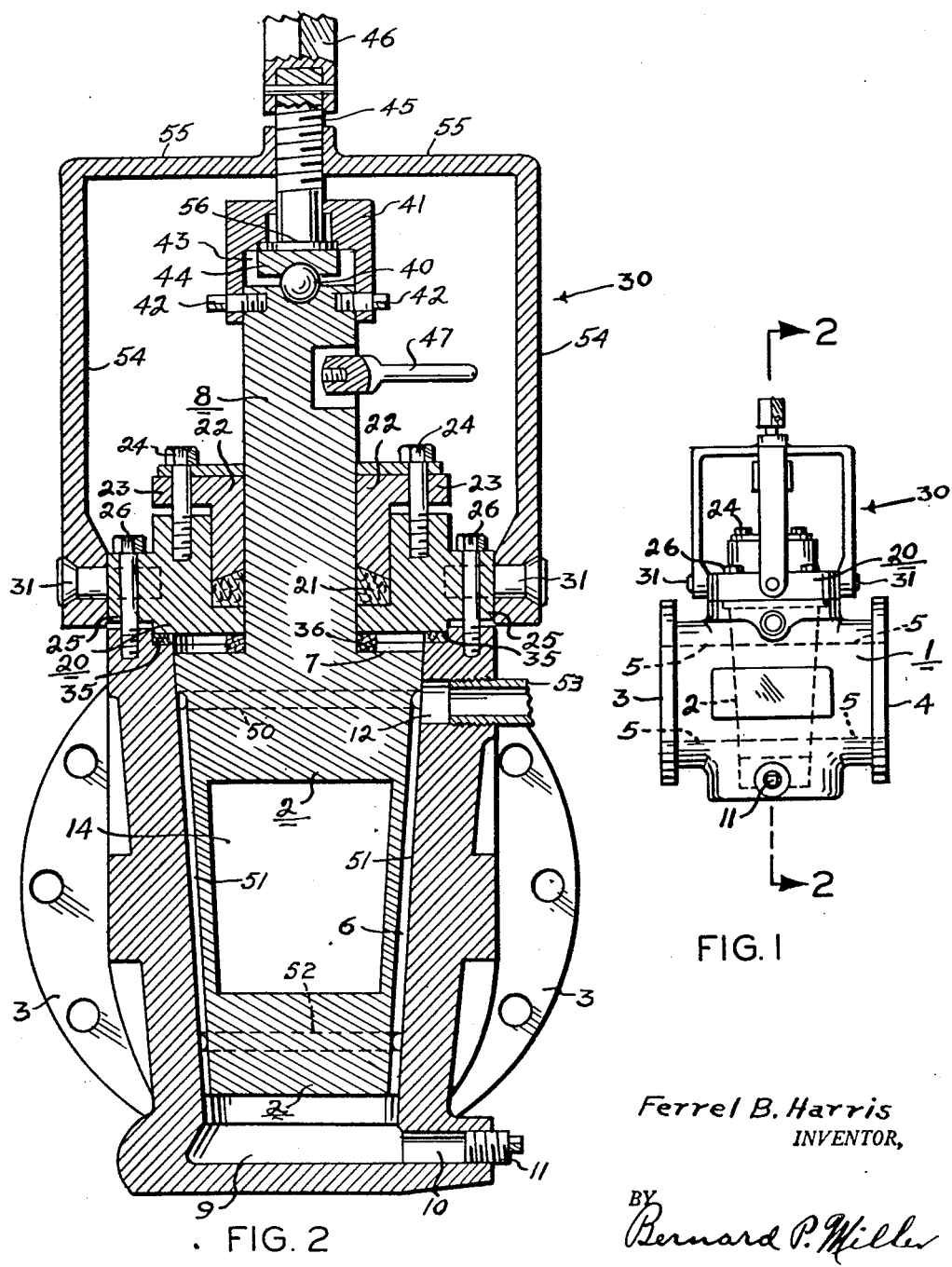
Figure 1 is an elevational side view.
Figure 2 is a vertical sectional view taken substantially along the line 2—2 of Fig. 1.

As stated hereinabove, the bonnet and packing arrangement of the present invention is adapted to be installed upon a conical plug-type valve. Such a valve is illustrated in the accompanying drawing, and consists substantially of a one-piece body having two abrupt ends 3 and 4, with a horizontal flow opening 5 extending therebetween. The body 1 has a vertically disposed, downwardly tapered conical valve chamber 6 formed therein, with the upper end of the chamber being opened. The chamber 6 intercepts the flow opening 5 of the body and is larger in diameter than the diameter of the flow opening 5. A conical valve head 7 having its outer peripheral surface complementary to the bore of the chamber 6, is rotatably disposed within the chamber 6, and has an abrupt upper end surface 7. The valve core is provided with a rigid stem 8 which projects upwardly beyond the surface 7 of the core.

An opening 12 is provided through the wall of the body 1 adjacent the upper end portion of the core 2 in communication with the bore of the chamber 6. The exterior surface of the core 2 is provided with an annular lubricant conveying groove 50 in fluid communication with the body opening 12, and a plurality of longitudinally disposed lubricant conveying grooves 51 in fluid communication with and extending downwardly from the groove 50 to the lowermost end of the core. The lower end portion of the core 2 is further provided exteriorly with an annular lubricant conveying groove 52 in spaced-apart relation with relation to the lowermost end of the core, and in fluid communication with the longitudinal grooves 51. The body 1 is provided with a lubricant retaining lower chamber 9 below the lowermost end of the core 2. A lateral opening 10 through the wall of the body 1 communicates with the chamber 9. A suitable plug 11 is threadedly engaged within the opening 10 to close the same. The valve core 2 has a horizontal through opening 14 which communicates with the flow opening 5 of the valve housing or body 1, when the core is rotated to the position illustrated in Fig. 2, in which the opening 14 is aligned with the flow opening 5. With the core 2 in this position, a lubricator, not shown, is connected to the body opening 12 by a suitable threadedly engaged nipple 53 and lubricant, not shown, is forced into the opening 12 through the annular groove 50 and downwardly through the longitudinal grooves 51 and into the lower chamber 9 and the lower annular groove 52, thus sealing the core 2 within the body 1. A conventional ball check, not shown, is used to retain the lubricant within the opening 12 after the lubricator is removed. Any time additional lubricant is needed to renew the seal of the valve core, it may be pumped into the grooves, as disclosed hereinabove, without necessitating the rotation of the core 2 to close the valve, as must be done with most conventional plug valves. Furthermore, it seems obvious that the plug 11 may be removed and lubricant circulated downwardly through the various grooves into the lower chamber 9 and out the lateral opening 10 to clean the core and the bore of the chamber 6 of hardened lubricant and effect a fresh seal.

The stem sealing mechanism of the present invention consists substantially of an annular bonnet 20 having a central opening of a diameter sufficient to barely permit the passage therethrough of the valve stem 8. Above the opening for receiving the valve stem, the bonnet 20 is provided with a chamber for receiving a suitable compressible packing 21 around the stem. A suitable annular follower 22 having an outstanding flange 23 is provided to fit within the packing chamber, and to compress the packing 21 therein. Suitable stud bolts 24 are provided in an annular row and pass through the flange 23. The studs 24 are threadedly engaged within the upper end of the bonnet 20, so as to urge the follower 22 in a downward direction.

The bonnet 20 has an annular flange 25 which is provided with a series of circularly located through perforations, for receiving a plurality of stud bolts 26, which attach the bonnet 20 to the upper end of the body 1.

A yoke 30 is attached to the periphery of the bonnet 20 by four pins 31, which are pressed in place, and which may easily be removed. The legs 54 of the yoke 30 are connected by integral horizontal cross-bars 55 which have a central threaded opening vertically disposed above the upper end of the stem, for the purpose more fully explained hereinbelow.

Between the lower surface of the bonnet 20 and the upper surface of the body 1, there is provided an annular packing element 35, which is adapted to seal between said two surfaces. Another packing element 36 is provided on the surface 7 around the stem 8.

The upper end of the valve stem 8 is provided with a concave socket into which is rotatably seated a steel ball 40. A tubate head 41 having a closed centrally perforated upper end is slipped downwardly over the upper end of the valve stem 8 and is held in place by two set screws 42. The head 41 has an opening or hollow portion 43 which houses a thrust plate 44 having a concavity to fit over the ball 40, and a threaded thrust pin 45 extends upwardly from the plate 44 through the perforation in the head and through the central threaded opening in the cross-bars 55 of the yoke 30. The pin 45 has an annular flange 56 adjacent its lower end to retain the pin 45 within the head 41. A lever 46 is pivotally connected to the upper end of the pin 45 so that the pin may be manually rotated to raise and lower the stem 8, and to consequently raise and lower the valve core 2. A laterally extending handle 47 is provided at the side of the stem 8, so that the stem and the valve core may be selectively rotated manually.

When it is desired to replace the packing 21, the studs 24 are removed and the follower 22 is raised out of the packing chamber. The packing 21 can then be replaced without moving the bonnet 20 from its sealing gasket or sealing element 35, thus making it possible for the packing 21 to be replaced, without in any manner cutting off the fluid pressure either within the flow line 5 and the valve opening 14, or in the lubricating system which surrounds the valve core 2.

When it is desired to replace the sealing element 35, the stud 26 must be removed and thereafter, the bonnet 20 and its attached mechanism can be lifted from the valve body 1, so that the packing element 35 can be replaced. In making this replacement, it is necessary that the fluid pressure be cut off from the valve.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A cut-off valve comprising: a body having aligned flow openings therethrough defining a passageway and having a seat formed transversely of the passageway, said body having a chamber below said seat and said passageway, said body having an upper lateral lubricant conveying opening through its wall adjacent the upper end of the seat and above the passageway, said body having a second lateral opening through its wall, communicating with the chamber below said seat; a plug threadedly engaged within said second opening for closing the same; a valve core rotatably mounted in said seat for closing the flow of fluid between the openings, said core having an upwardly extending operating stem, said stem having a central concave socket in its upper end, said core having an upper annular groove in its exterior surface communicating with the upper opening in said body, said core having a lower annular groove in its exterior surface below the passageway in said body, said core having a plurality of longitudinal grooves in its exterior surface adjacent the seat in said body extending from the uppermost annular groove to the lower end of the core, whereby lubricant under pressure may be forced into the upper lateral opening and into the annular and longitudinal grooves, sealing said core with the seat of said body; a bonnet carried by the upper surface of said body and having an annular recess surrounding said stem; packing within the recess of said bonnet; a yoke rigidly connected to said bonnet, said yoke having a connecting centrally perforated cross-bar extending horizontally above the upper end of said stem; a tubate head enveloping the uppermost end of said stem and having its lowermost end rigidly connected to said stem; a thrust plate disposed within said tubate head, said plate having a downwardly presented concavity; a steel ball nested within the socket in said stem and within the concavity of said plate; a thrust pin threadedly engaged through the perforation of said cross-bar, said pin having an annular flange on its lowermost end rotatably carried by said tubate head and contacting said thrust plate; and a lever pivotally connected to the upper end of said pin for rotating said thrust pin to raise and lower said stem and said core.

2. A cut-off valve comprising: a body having aligned flow openings therethrough defining a passageway and having a seat formed transversely of the passageway; a valve core rotatably mounted in said seat for closing the flow of fluid between the openings, said core having an upwardly extending operating stem, said stem having a central concave socket in its upper end; a bonnet carried by the upper surface of said body and having an annular recess surrounding said stem; packing within the recess of said bonnet; a packing gland operatively connected to said bonnet for compressing said packing and sealing around said stem; a yoke rigidly connected to said bonnet, said yoke having a connecting centrally perforated cross-bar extending horizontally above the upper end of said stem; a tubate head enveloping the uppermost end of said stem and having its lowermost end rigidly connected to said stem; a thrust plate disposed within said tubate head, said plate having a downwardly presented concavity; a steel ball nested within the socket in said stem and within the concavity of said plate; a thrust pin threadedly engaged through the perforation of said cross-bar, said pin having an annular flange on its lowermost end rotatably carried by said tubate head and contacting said thrust plate; and a lever pivotally connected to the upper end of said pin for rotating said thrust pin to raise and lower said stem and said core.

References Cited in the file of this patent

UNITED STATES PATENTS

| | | |
|---|---|---|
| 1,406,191 | Irving | Feb. 14, 1922 |
| 1,580,248 | Heylman | Apr. 13, 1926 |
| 1,661,310 | Schmidt | Mar. 6, 1928 |
| 2,001,035 | Noll | May 14, 1935 |
| 2,175,867 | Ballard | Oct. 10, 1939 |
| 2,307,443 | Atkinson | Jan. 5, 1943 |
| 2,485,831 | Jacobsen | Oct. 25, 1949 |